United States Patent
Hoprich (10) Patent No.: US 11,748,409 B2
(45) Date of Patent: *Sep. 5, 2023

(54) SYSTEM AND METHOD FOR MIGRATING DATABASES

(71) Applicant: SAP SE, Walldorf (DE)

(72) Inventor: Wieland Hoprich, Mannheim (DE)

(73) Assignee: SAP SE, Walldorf (DE)

( * ) Notice: Subject to any disclaimer, the term of this patent is extended or adjusted under 35 U.S.C. 154(b) by 37 days.

This patent is subject to a terminal disclaimer.

(21) Appl. No.: 17/473,883

(22) Filed: Sep. 13, 2021

(65) Prior Publication Data

US 2021/0406308 A1 Dec. 30, 2021

Related U.S. Application Data

(63) Continuation of application No. 15/997,678, filed on Jun. 4, 2018, now Pat. No. 11,120,080.

(51) Int. Cl.
| | | |
|---|---|---|
| *G06F 16/907* | (2019.01) | |
| *G06F 16/901* | (2019.01) | |
| *G06F 8/65* | (2018.01) | |
| *G06F 16/23* | (2019.01) | |

(52) U.S. Cl.
CPC ............ *G06F 16/901* (2019.01); *G06F 8/65* (2013.01); *G06F 16/23* (2019.01); *G06F 16/907* (2019.01)

(58) Field of Classification Search
CPC .......... G06F 16/23; G06F 16/907; G06F 8/65
See application file for complete search history.

(56) References Cited

U.S. PATENT DOCUMENTS

| | | | |
|---|---|---|---|
| 9,773,048 B2 | 9/2017 | Sarferaz | |
| 11,120,080 B2 | 9/2021 | Hoprich | |
| 2003/0130985 A1 | 7/2003 | Driesen et al. | |
| 2010/0138821 A1* | 6/2010 | Driesen ................... | G06F 8/65 |
| | | | 718/104 |
| 2017/0123787 A1 | 5/2017 | Burkhardt et al. | |
| 2019/0370405 A1 | 12/2019 | Hoprich | |

* cited by examiner

*Primary Examiner* — Robert W Beausoliel, Jr.
*Assistant Examiner* — Nirav K Khakhar
(74) *Attorney, Agent, or Firm* — Fountainhead Law Group P.C.

(57) ABSTRACT

Some embodiments provide a non-transitory machine-readable medium that stores a program. The program receives data from a subset of a first set of exchange tables stored in a first database of a source system. The program further creates a second set of exchange tables in a second database of the device. The program also creates a set of shadow tables in the second database of the device. The program further adapts the second set of exchange tables and the set of shadow tables to a higher upgrade version. The program also performs object generation based on the second set of exchange tables and the set of shadow tables. The program further drops the set of shadow tables. The program also receives a set of application tables from the source system. The program further adapts the set of application tables to the higher upgrade version.

20 Claims, 10 Drawing Sheets

SYSTEM AND METHOD FOR MIGRATING DATABASES

CROSS-REFERENCE TO RELATED APPLICATION

This application is a continuation of U.S. patent application Ser. No. 15/997,678, filed Jun. 4, 2018 and entitled "SYSTEM AND METHOD FOR MIGRATING DATABASES," the entire contents of which are incorporated herein by reference in their entirety for all purposes.

BACKGROUND

There exists many types of databases used for storing data as well as many companies that produce different software and tools for managing databases. When switching from one type of database to another type of database or from a database developed by one company to another database developed by a different company, the databases in an existing system may need to be migrated to a new system, which may require a large amount of downtime. In many cases, existing software may need to be updated and/or new software may need to be installed for the new system. Various techniques are utilized for migrating databases. For instance, an existing system may create a staging area that is used to prepare databases for a new system. Certain data in the databases of the existing system may be migrated to the staging area and new and/or updated software may be installed in the staging area. Once the staging area is finished, the data in the staging area can be transferred to the new system. Then, remaining data in the databases of the existing system can be transferred to the new system.

SUMMARY

In some embodiments, a non-transitory machine-readable medium stores a program. The program receives data from a subset of a first set of exchange tables stored in a first database of a source system. The program further creates a second set of exchange tables in a second database of the device. The second set of exchange tables includes the data from the subset of the first set of exchange tables and data from an upgrade version of the set of exchange tables stored in the first database of the source system. The program also creates a set of shadow tables in the second database of the device. The set of shadow tables corresponds to a subset of a first set of application tables stored in the first database of the source system. The set of shadow tables includes data from an upgrade version of the subset of the first set of application tables stored in the first database of the source system. The program further adapts the second set of exchange tables and the set of shadow tables to a higher upgrade version. The program also performs object generation based on the second set of exchange tables and the set of shadow tables. The program further drops the set of shadow tables. The program also receives a set of application tables from the source system. The program further adapts the set of application tables to the higher upgrade version.

In some embodiments, the program may further install, on the device, a first kernel that is the higher upgrade version of a second kernel operating on the source system. The set of shadow tables may include a minimal set of data required for operation of the first kernel on the device. The program may further receive, from the source system, a first set of table metadata associated with the first set of exchange tables stored in the first database of the source system and the first set of application tables stored in the first database of the source system; receive a second set of table metadata associated with an upgrade version of the first set of exchange tables stored in the first database of the source system and an upgrade version of the first set of application tables stored in the first database of the source system; determine a set of differences between the first set of table metadata and the second set of table metadata; and generate a set of instructions based on the set of differences. Adapting the set of application tables to the higher upgrade version may include executing the set of instructions. The first set of table metadata and the second set of table metadata may be received from a file directory shared between the device and the source system.

In some embodiments, the machine-readable medium is a first machine-readable medium. The program may further retrieve the data from the upgrade version of the set of exchange tables stored on the source system from a second machine-readable medium. The program may also retrieve the data from the upgrade version of the set of shadow tables stored on the source system from the second machine-readable medium.

In some embodiments, a method for a device receives data from a subset of a first set of exchange tables stored in a first database of a source system. The method further creates a second set of exchange tables in a second database of the device. The second set of exchange tables includes the data from the subset of the first set of exchange tables and data from an upgrade version of the set of exchange tables stored in the first database of the source system. The method also creates a set of shadow tables in the second database of the device. The set of shadow tables corresponds to a subset of a first set of application tables stored in the first database of the source system. The set of shadow tables includes data from an upgrade version of the subset of the first set of application tables stored in the first database of the source system. The method further adapts the second set of exchange tables and the set of shadow tables to a higher upgrade version. The method also performs object generation based on the second set of exchange tables and the set of shadow tables. The method further drops the set of shadow tables. The method also receives a set of application tables from the source system. The method further adapts the set of application tables to the higher upgrade version.

In some embodiments, the method may further install, on the device, a first kernel that is the higher upgrade version of a second kernel operating on the source system. The set of shadow tables may include a minimal set of data required for operation of the first kernel on the device. The method may further receive, from the source system, a first set of table metadata associated with the first set of exchange tables stored in the first database of the source system and the first set of application tables stored in the first database of the source system; receive a second set of table metadata associated with an upgrade version of the first set of exchange tables stored in the first database of the source system and an upgrade version of the first set of application tables stored in the first database of the source system; determine a set of differences between the first set of table metadata and the second set of table metadata; and generate a set of instructions based on the set of differences. Adapting the set of application tables to the higher upgrade version may include executing the set of instructions. The first set of table metadata and the second set of table metadata may be received from a file directory shared between the device and the source system.

In some embodiments, the method may further retrieve the data from the upgrade version of the set of exchange tables stored on the source system from a machine-readable medium. The method may also retrieve the data from the upgrade version of the set of shadow tables stored on the source system from the second machine-readable medium.

In some embodiments, a system includes a set of processing units and a non-transitory machine-readable medium that stores instructions. The instructions cause at least one processing unit to receive data from a subset of a first set of exchange tables stored in a first database of a source system The instructions further cause the at least one processing unit to create a second set of exchange tables in a second database of the system. The second set of exchange tables includes the data from the subset of the first set of exchange tables and data from an upgrade version of the set of exchange tables stored in the first database of the source system. The instructions also cause the at least one processing unit to create a set of shadow tables in the second database of the system. The set of shadow tables corresponds to a subset of a first set of application tables stored in the first database of the source system. The set of shadow tables includes data from an upgrade version of the subset of the first set of application tables stored in the first database of the source system. The instructions further cause the at least one processing unit to adapt the second set of exchange tables and the set of shadow tables to a higher upgrade version. The instructions also cause the at least one processing unit to perform object generation based on the second set of exchange tables and the set of shadow tables. The instructions further cause the at least one processing unit to drop the set of shadow tables. The instructions also cause the at least one processing unit to receive a set of application tables from the source system. The instructions further cause the at least one processing unit to adapt the set of application tables to the higher upgrade version.

In some embodiments, the instructions may further cause the at least one processing unit to install, on the system, a first kernel that is the higher upgrade version of a second kernel operating on the source system. The set of shadow tables may include a minimal set of data required for operation of the first kernel on the device. The instructions may further cause the at least one processing unit to receive, from the source system, a first set of table metadata associated with the first set of exchange tables stored in the first database of the source system and the first set of application tables stored in the first database of the source system; receive a second set of table metadata associated with an upgrade version of the first set of exchange tables stored in the first database of the source system and an upgrade version of the first set of application tables stored in the first database of the source system; determine a set of differences between the first set of table metadata and the second set of table metadata; and generate a set of instructions based on the set of differences. Adapting the set of application tables to the higher upgrade version may include executing the set of instructions.

In some embodiments, the instructions may further cause the at least one processing unit to retrieve the data from the upgrade version of the set of exchange tables stored on the source system from a machine-readable medium. The instructions may also cause the at least one processing unit to retrieve the data from the upgrade version of the set of shadow tables stored on the source system from the second machine-readable medium.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for migrating databases from a source system to a target system. In some embodiments, the source system prepares for the migration operation by transferring metadata that describes the table structures of the source system along with a portion of the data in the tables to a shared file directory. The target system retrieves some of this information from the shared directory and uses it to create a shadow system on the target system. The target system may also install a kernel on the target system. Next, the target system adapts the table structures and the contents of the tables of the shadow system to the desired upgrade level. The source system then transfers the remaining data in the tables of the source system to the target system. Finally, the target system adapts the contents of the tables received from the source system to the desired upgrade level.

The techniques described in the present application provide a number of benefits and advantages over conventional methodologies for migrating databases. For example, preparing and utilizing a shadow system on the target system (as opposed to the source system) prevents the database migration to be tied to any requirements that the source system may have. For instance, using a shadow system on the target system allows prevents database migrations to be tied to a kernel used in the source system. However, the source system may restrict the types and/or versions of kernel that can be installed on the source system, thereby limiting the types and/or versions of kernel that can be installed for a shadow system that is implemented on the source system. Second, executing the target release operations on the database of the target system allows the target system to be decoupled from the requirements of the source system. This provides more flexibility in the database migration process. For example, certain operations (e.g. data encoding conversion), which might otherwise need to be performed outside of the database migration process, can be performed as part of the database migration process.

Figure 1:
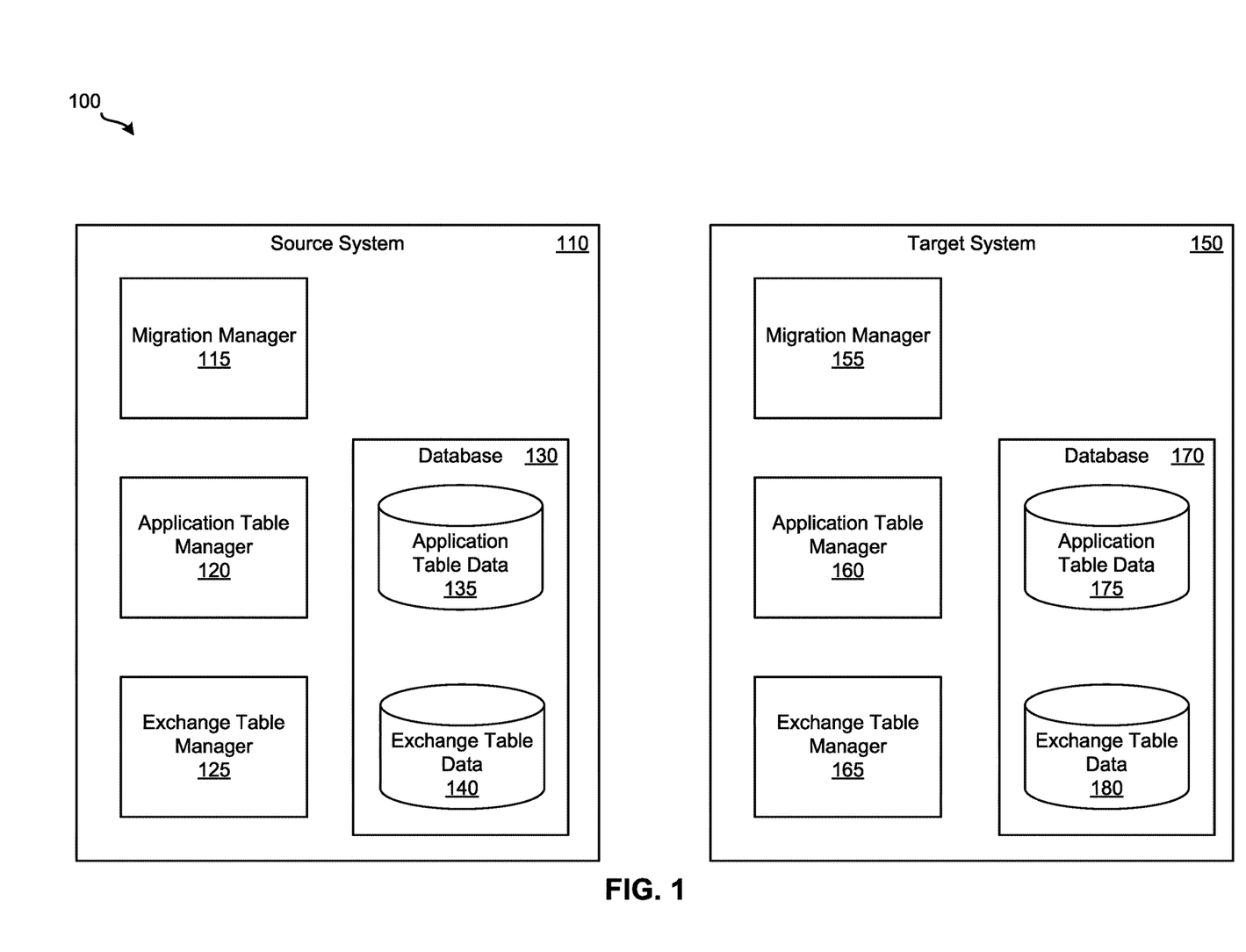
FIG. 1 illustrates a system for migrating databases according to some embodiments.

FIG. 1 illustrates a system 100 for migrating databases according to some embodiments. As shown, system 100 includes source system 110 and target system 150. Source system 110 includes migration manager 115, application table manager 120, exchange table manager 125, and database 130. Database 130 includes storages 135 and 140. Application table data storage 135 is configured to store applications operable on source system 110 and tables of data consumed, generated, and/or modified by the applications. Exchange table data storage 140 is configured to store operating system tools, operating system applications, other system tools, and/or the like. Exchange table data storage 140 can also store table metadata describing the structure of tables stored in application table data storage 135 and exchange table data storage 140. In some embodiments, table metadata are stored in a data dictionary. Examples of table metadata may include names of tables, columns of tables, names of columns, types of data that can be stored in columns, etc. In some embodiments, storage 135 and 140 may be implemented as a single database. In some such embodiments, the tables of exchange table data storage 140 are a subset of the tables stored in application table data storage 135. In some embodiments, storages 135 and 140 are implemented in a single physical storage while, in other embodiments, storages 135 and 140 may be implemented across several physical storages. While FIG. 1 shows storages 135 and 140 as part of source system 110, one of ordinary skill in the art will appreciate that one or more storages 135 and/or 140 may be external to source system 110 in some embodiments. Migration manager 115 is responsible for managing the various operations during the migration of databases. Application table manager 120 manages data stored in application table data storage 135. Exchange table manager 125 manages data stored in exchange table data storage 140.

As illustrated in FIG. 1, target system 150 includes migration manager 155, application table manager 160, exchange table manager 165, and database 170. Database 170 includes storages 175 and 180. Application table data storage 175 is configured to store applications operable on target system 150 and tables of data consumed, generated, and/or modified by the applications. Exchange table data storage 180 is configured to store source code of applications in tables. Exchange table data storage 180 can also store table metadata describing the structure of tables stored in application table data storage 135 and exchange table data storage 140. Examples of table metadata may include names of tables, columns of tables, names of columns, types of data that can be stored in columns, etc. In some embodiments, storage 175 and 180 may be implemented as a single database. In some such embodiments, the tables of exchange table data storage 180 are a subset of the tables stored in application table data storage 175. In some embodiments, storages 175 and 180 are implemented in a single physical storage while, in other embodiments, storages 175 and 180 may be implemented across several physical storages. While FIG. 1 shows storages 175 and 180 as part of target system 150, one of ordinary skill in the art will appreciate that one or more storages 175 and/or 180 may be external to target system 150 in some embodiments. Migration manager 155 is responsible for managing the various operations during the migration of databases. Application table manager 160 manages data stored in application table data storage 175. Exchange table manager 165 manages data stored in exchange table data storage 180.

Figure 2:
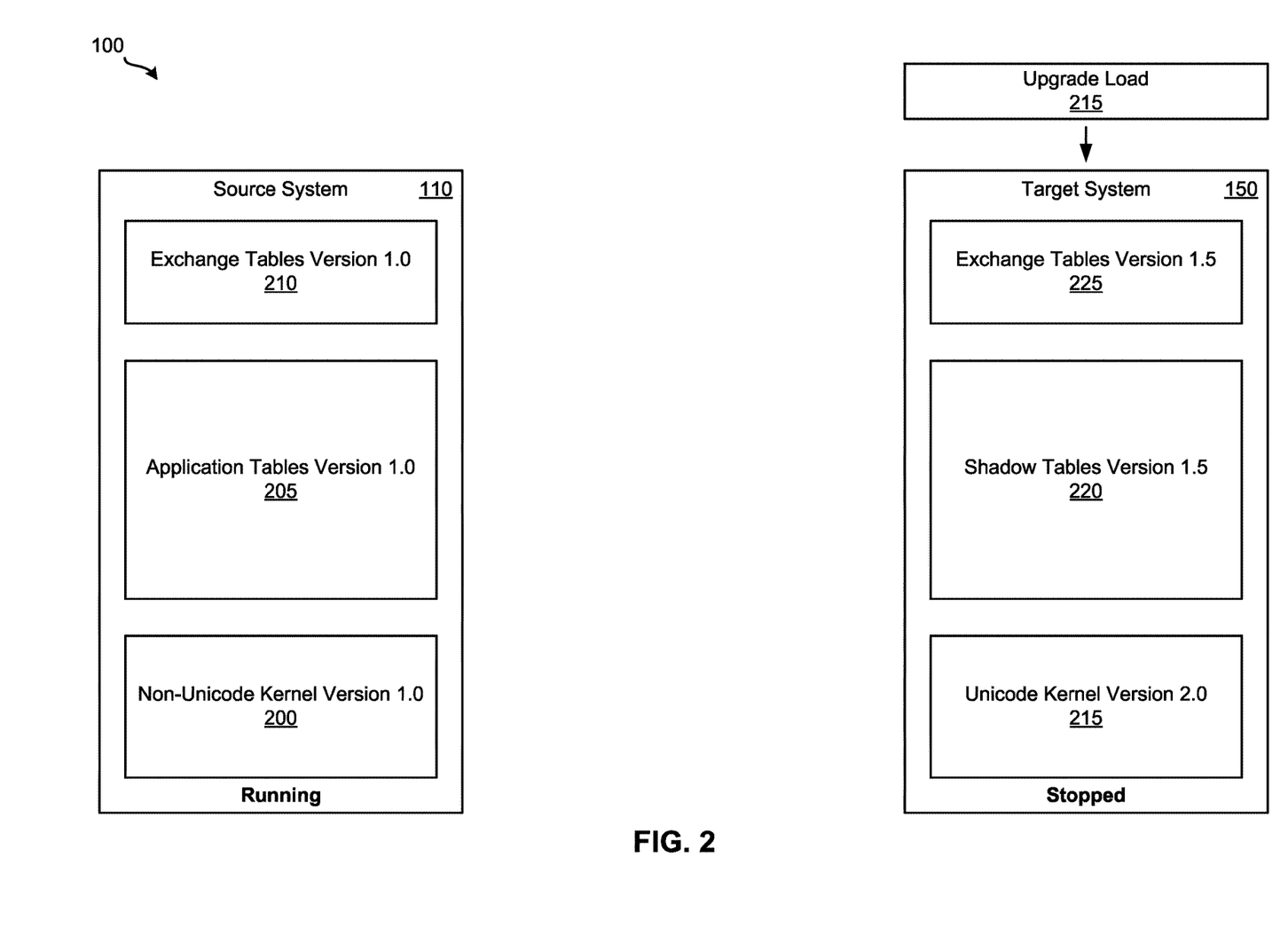
FIG. 2 illustrates the start of a database migration according to some embodiments.

An example operation of system 100 will now be described by reference to FIGS. 1-11. The example operation is a database migration from source system 110 to target system 150 that includes a version upgrade of software (e.g., applications, services, etc.) and data along with a conversion of data encoding from a non-Unicode encoding to a Unicode encoding. FIG. 2 illustrates the start of a database migration according to some embodiments. As shown in FIG. 2, exchange tables 210 and application tables 205 are stored on source system 110. In this example, exchange tables 210 are stored in exchange table data storage 140 while application tables 205 are stored in application table data storage 135. In addition, source system 110 has a non-Unicode kernel 200 operating on source system 110. Thus, the table structures of exchange tables 210 and application tables 205 as well as the data stored in these tables are encoded in a non-Unicode encoding (e.g., an American Standard Code for Information Interchange (ASCII) encoding, an Extended Binary Coded Decimal Interchange Code (EBCDIC) encoding, etc.). Exchange tables 210, application tables 205, and kernel 200 are depicted as version 1.0, which is the current version of software (e.g., applications, services, etc.) stored on source system 110. As indicated in FIG. 2, source system 110 is in a running state. In some embodiments, when a system is in a running state, users may log into the system and access applications and data stored on the system. In some embodiments, migration manager 115 may import from a data source (e.g., a website, a machine-readable medium, etc.) several upgrade tools for performing upgrade operations during the database migration.

At this stage, target system 150 is a bare system that does not have any data stored in database 170 nor a kernel installed. Migration manager 155 installs a Unicode kernel 215 on target system 150. In some embodiments, migration manager 115 installs kernel 215 from a machine-readable medium (e.g., a compact disc (CD), a digital video disc (DVD), etc.) by copying an executable file on an operating system level from the machine-readable medium to a directory in database 170. As indicated in FIG. 2, the version of kernel 215 is 2.0, which is the desired upgrade level in this example.

Next, target system 150 receives upgrade load 215, as shown in FIG. 2. For this example, upgrade load 215 includes exchange tables 225 and content (e.g., data) for exchange tables 225. In some embodiments, shadow tables 220 and the content in shadow tables 220 include the minimal set of applications, services, and/or data required to operate target system 150. In some such embodiments, shadow tables 220 and the content in shadow tables 220 are a subset of application tables 205, which source system 110 transfers to target system 150. In this example, upgrade load 215 is considered a major software release that is an upgrade of the software operating on source system 110. However, the version of upgrade load 215 is not the desired upgrade version for target system 150, as indicated by the depiction of exchange tables 225 and shadow tables as being version 1.5. Upgrade load 215 may be provided by a machine-readable medium (e.g., a compact disc (CD), a digital video disc (DVD), etc.). As mentioned above, migration manager 155 installs kernel 215 from a machine-readable medium in some embodiments. In some such embodiments, the machine-readable medium from which migration manager 155 installs kernel 215 and the machine-readable medium that provides upgrade load 215 are the same.

When target system 150 receives upgrade load 215, application table manager 160 creates shadow tables 220 and transfers the content for shadow tables 220 from upgrade load 215 to application table data storage 175. Additionally, exchange table manager 165 creates exchange tables 225 and transfers the content for exchange tables 225 from upgrade load 215 to exchange table data storage 180. As shown in FIG. 2, target system 150 is in a stopped state. In some embodiments, when a system is in a stopped state, users may not log into the system (except for administrative users), the kernel on the system is not running. However, when a system is in a stopped state, the database and database software on the system is running, which allows administrative users to access and modify data stored in the database. In some embodiments, migration manager 155 may import from a data source (e.g., a website, a machine-readable medium, etc.) several upgrade tools for performing upgrade operations during the database migration.

Figure 3:
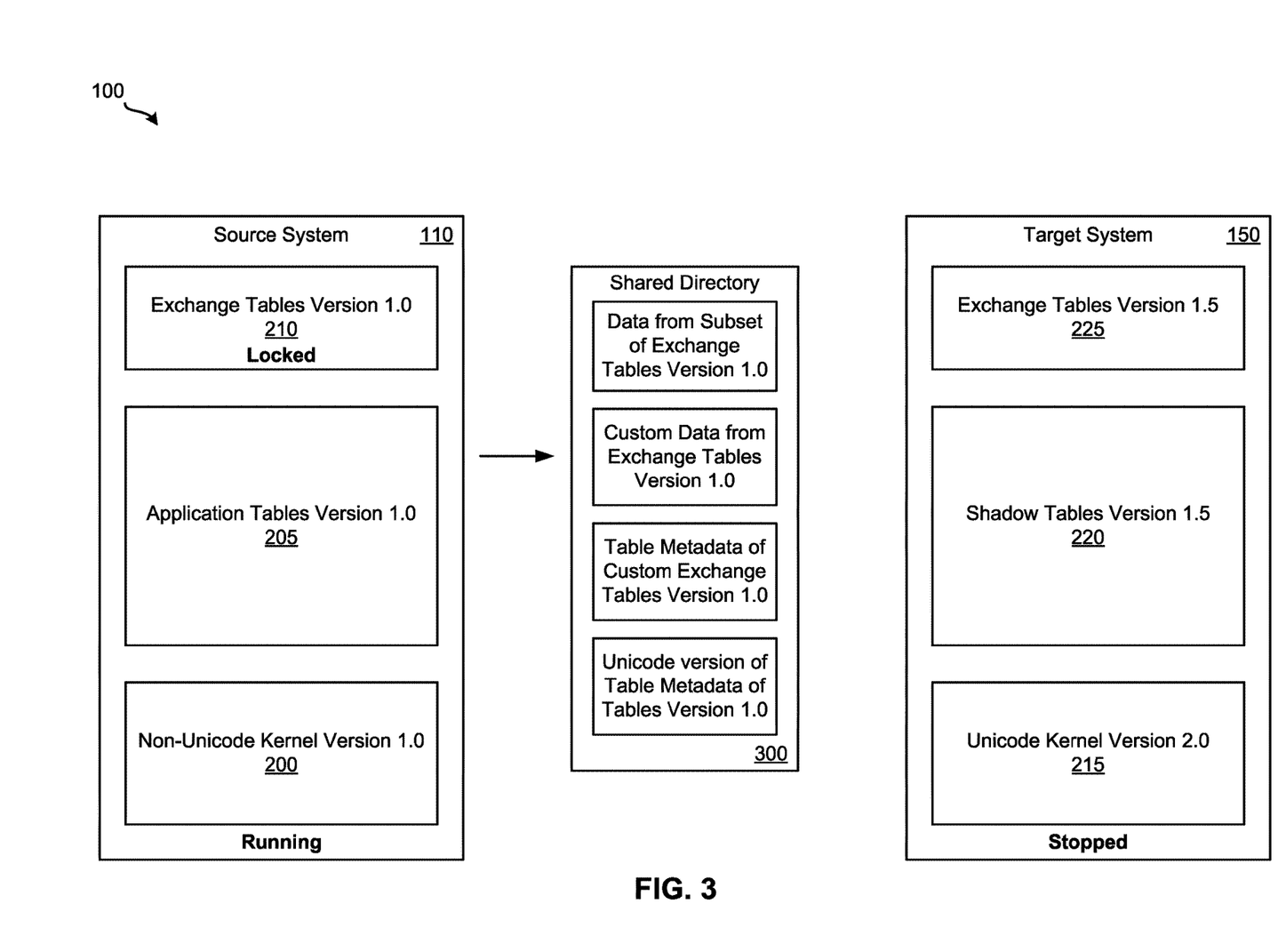
FIG. 3 illustrates the preparation for adapting a target system according to some embodiments.

Next, operations to prepare for adapting target system 150 are performed. FIG. 3 illustrates the preparation for adapting target system 150 according to some embodiments. At this stage, source system 110 is in a running state and migration manager 115 has locked (e.g., using a semaphore) exchange tables 210, as indicated in FIG. 3. Target system 150 is in a stopped state. When exchange tables 210 are in a locked state, changes cannot be made to exchange tables 120. However, exchange tables 210 can still be read and applications stored in exchange tables 210 can still be executed. Then, migration manager 115 prepares content in a subset of exchange tables 210 for transport. Migration manager 115 also prepares any custom development objects (e.g., custom source code) and/or generated development objects (e.g., executable files compiled from custom source code)) stored in exchange tables 210 for transport. In some cases, application tables 205 may have custom tables, custom columns, etc. (e.g., tables, columns, etc. not provided in software releases but added by users of source system 110). In some such cases, migration manager 115 prepares table metadata describing the custom structures of application tables 205 for transport. Then, migration manager 115 can prepare Unicode versions of table metadata describing the structure for exchange tables 210 and application tables 205 and stores the table metadata in a table in database 130 (e.g., exchange data table storage 140). Finally, migration manager 115 transports all the prepared data (i.e., content in a subset of exchange tables 210, custom development objects, generated custom development objects, table metadata describing the custom structures of exchange tables 210, and/or Unicode versions of table metadata describing the structure for exchange tables 210 and application tables 205) to shared directory 300, as shown in FIG. 3. In some embodiments, shared directory 300 is a file directory of source system 110 that is shared with target system 150. In other embodiments, shared directory 300 is a file directory of target system 150 that is shared with source system 110. Still, in some embodiments, shared directory 300 is implemented as a file directory of source system 110 and a file directory of target system 150 that share data between each other (e.g., by copying data between the two directories).

Figure 4:
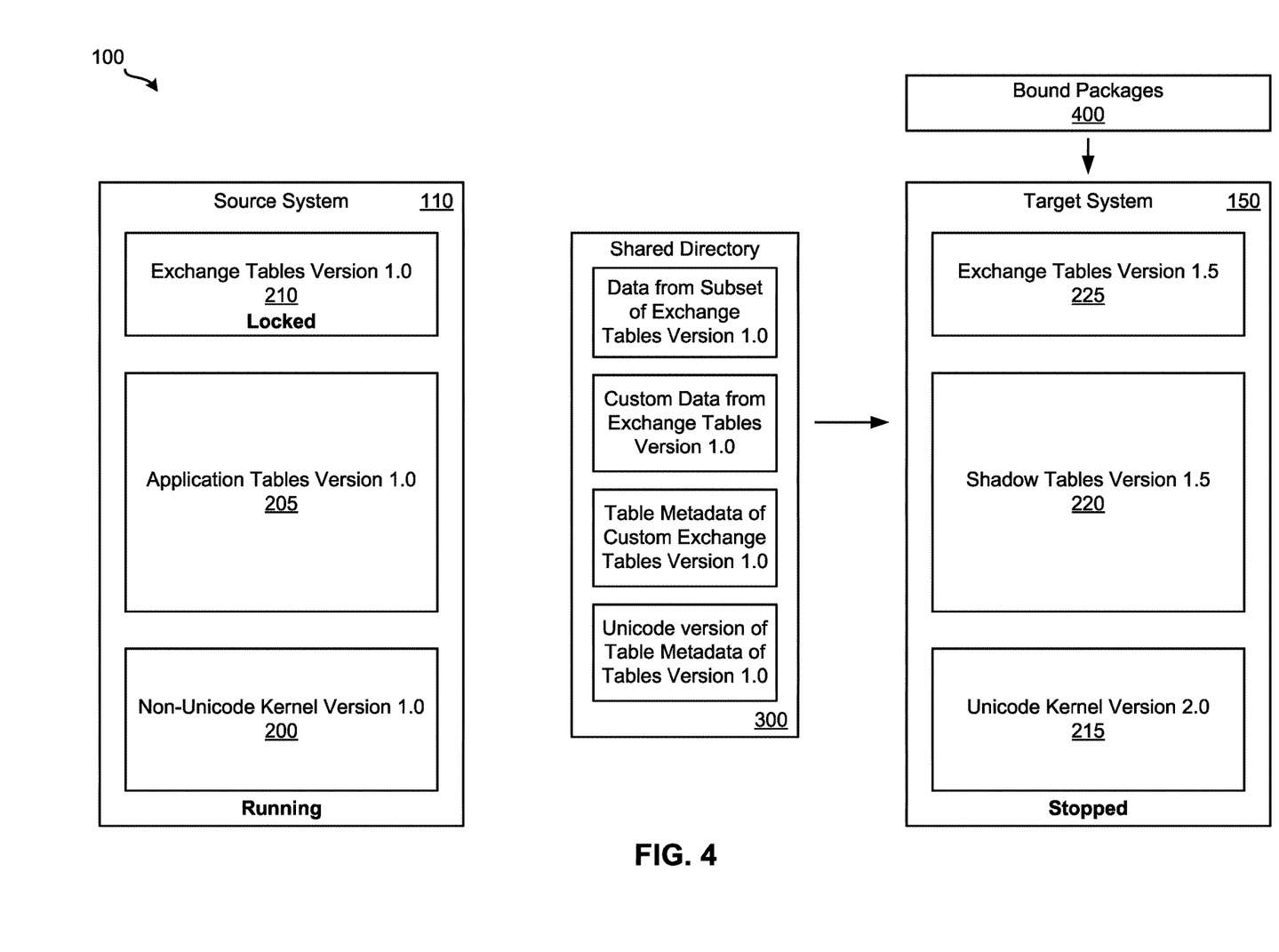
FIG. 4 illustrates the enrichment of a target system according to some embodiments.

After preparing for adapting target system 150, operations for enriching target system 150 are performed. FIG. 4 illustrates the enrichment of a target system according to some embodiments. In this stage, source system 110 is in a running state, exchange tables 210 are in a locked state, and target system 150 is in a stopped state. The operations for enriching target system 150 start by migration manager 155 importing from shared directory 300 the content in the subset of exchange tables 210, the table metadata describing the custom structures of exchange tables 210, and the Unicode versions of table metadata describing the structure for exchange tables 210 and application tables 205. Exchange table manager 165 stores the content in the subset of exchange tables 210 in corresponding tables in exchange table data storage 180. Exchange table manager 165 also stores the table metadata describing the custom structures of exchange tables 210 and the Unicode versions of table metadata describing the structure for exchange tables 210 and application tables 205 in exchange table data storage 180.

FIG. 4 also shows target system 150 receiving bound packages 400. In some embodiments, bound packages can include updates (e.g., enhancements, support, and/or corrections) to software. In some such embodiments, bound packages can also include table metadata describing the structure of tables storing applications and/or data for the updates to the software. In this example, bound packages 400 includes updates to software version 1.5 that bring the software up to version 2.0. Bound packages 400 also include, in this example, table metadata associated with these updates to software version 1.5. When target system 150 receives bound packages 400, migration manager 160 retrieves the table metadata associated with the updates to software version 1.5. Then, exchange table manager 165 stores the table metadata in exchange table data storage 180.

Figure 5:
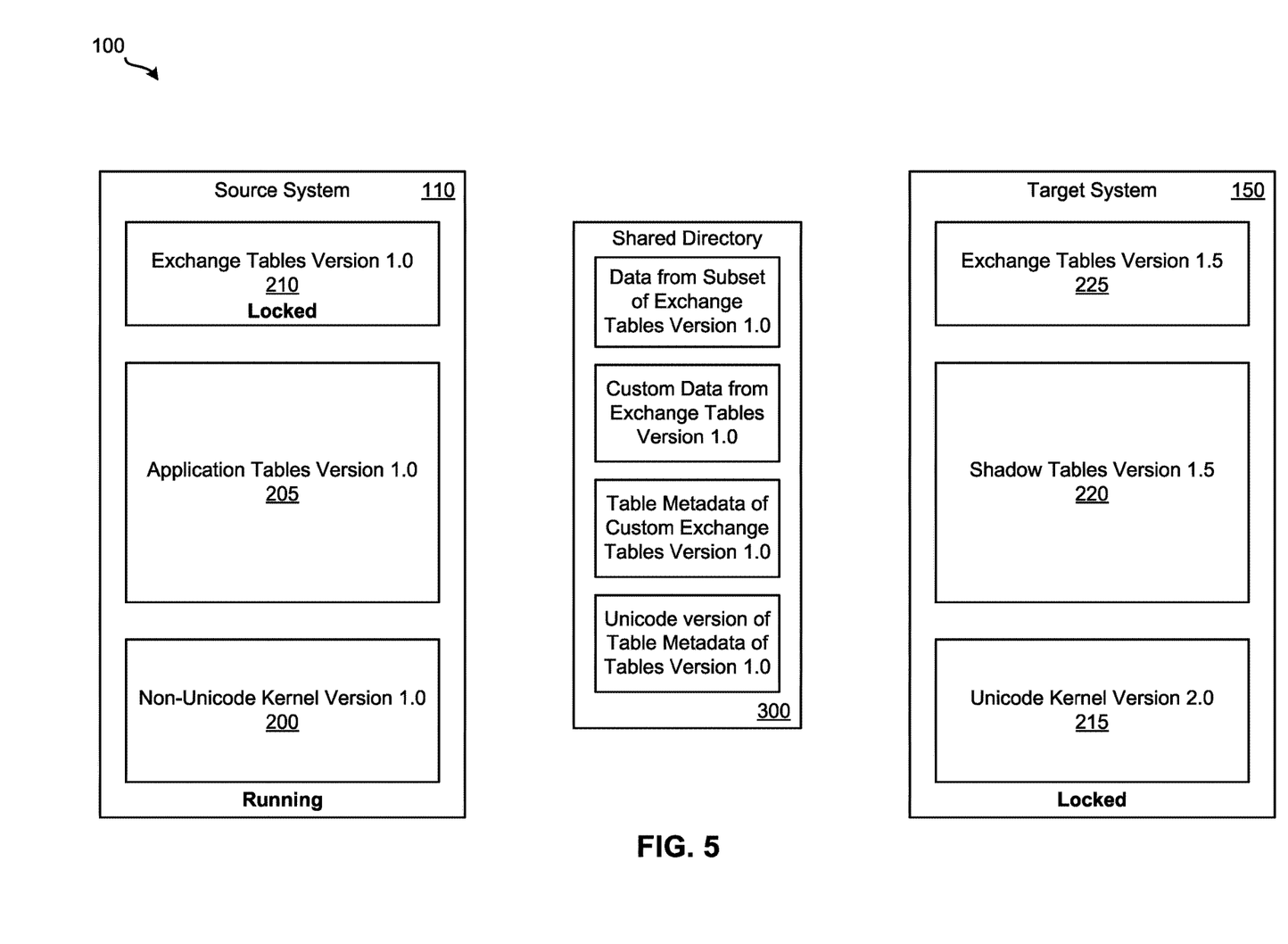
FIG. 5 illustrates the activation of data dictionaries of a target system according to some embodiments.

Operations for activating data dictionaries in target system 150 are performed next. FIG. 5 illustrates the activation of data dictionaries of target system 150 according to some embodiments. At this stage, source system 110 is in a running state, exchange tables 210 are in a locked state, and target system 150 is in a stopped state. The operations for activating data dictionary in target system 150 begins with starting target system 150 in a locked state. In some embodiments, when a system is in a locked state, the kernel on the system is running and users may not log into the system (except for administrative users). In some cases, data dictionaries provided in software releases (e.g., data dictionaries created by the developer of the software) and stored in exchange tables 210 of source system 110 may be subsequently modified by users of source system 110. In some such cases, the same or similar modifications can be made to the corresponding data dictionaries provided in upgrade load 215 and stored in exchange tables 225. In some embodiments, these modifications are performed by a user of target system 150. Next, migration manager 155 activates the data dictionaries stored in exchange tables 225. In some embodiments, migration manager 155 activates the data dictionaries by verifying the data dictionaries for correctness, instructing exchange table manager 165 to create tables in exchange tables 225 based on the data dictionaries, and instructing application table manager 160 to create shadow tables 220 based on the data dictionaries. Migration manager 155 can also generate runtime object versions of data dictionaries.

Finally, migration manager 155 determines differences between the table structure described by the Unicode versions of table metadata describing the structure for exchange tables 210 and application tables 205 in exchange table data storage 180 and the table structure created by the activation of the data dictionaries on target system 150. Based on the differences, migration manager 155 generates a set of instructions (e.g., a set of data definition language (DDL) statements) for modifying the table structure of the source system 110 to match the table structure of the target system 150. For example, if the table structure of the target system 150 has an additional table and/or an additional column of an existing table, migration manager 115 generates instructions to add the additional table and/or add the additional column to the existing table. Similarly, if the table structure of the target system 150 does not have a particular table in the source system 110 and/or does not have a column of an existing table in the source system 110, migration manager 155 generates instructions to delete the particular table and/or delete the column from the existing table. Migration manager 155 stores the set of generated instructions in a table in database 170 (e.g., exchange data table storage 180).

Figure 6:
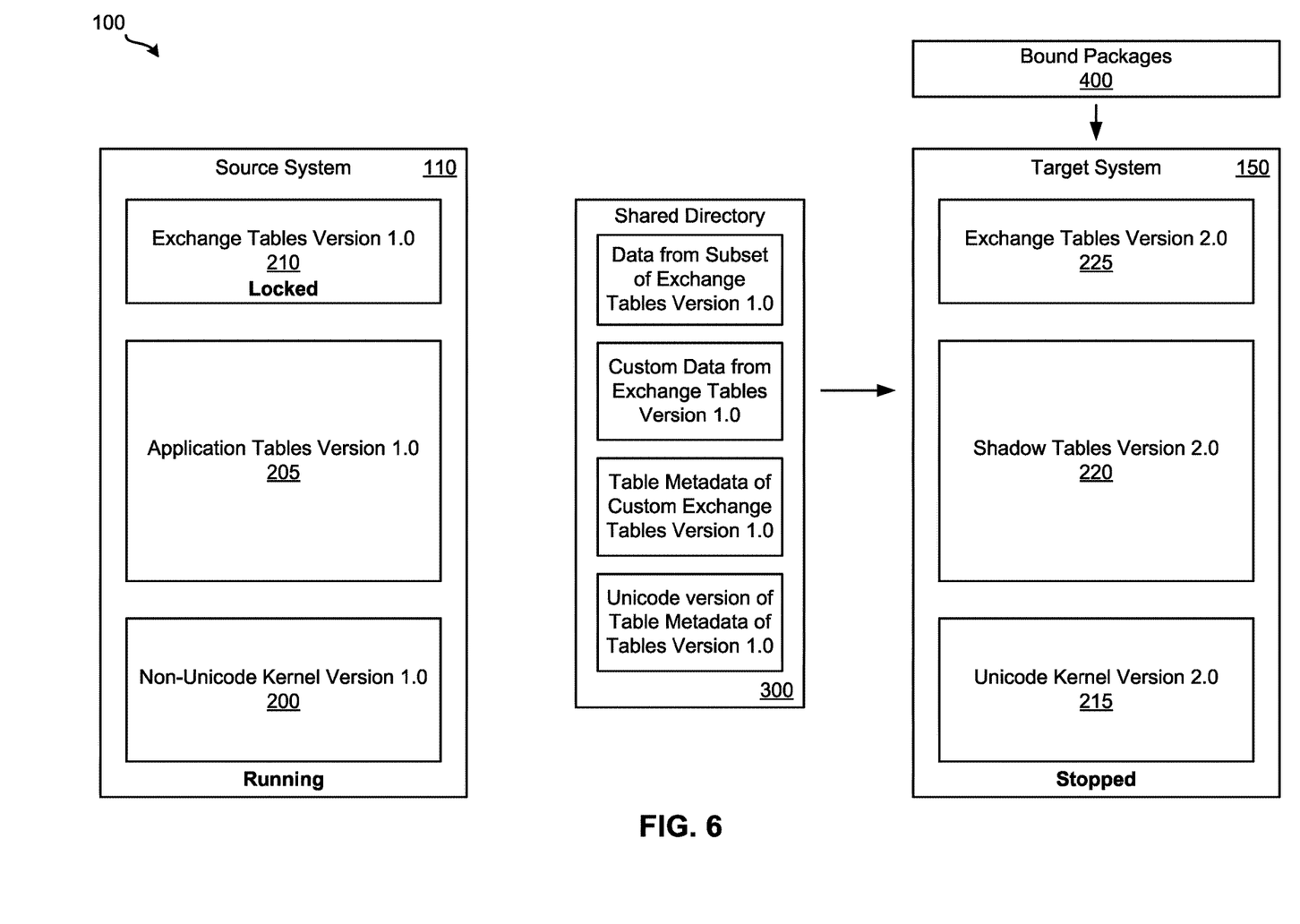
FIG. 6 illustrates the adaption of exchange tables and shadow tables of a target system according to some embodiments.

Next, operations for adapting exchange tables and shadow tables of target system 150 are performed. FIG. 6 illustrates the adaption of exchange tables and shadow tables of target system 150 according to some embodiments. In this stage, source system 110 is in a running state, exchange tables 210 are in a locked state, and target system 150 is in a locked state. In addition, target system 150 is receiving bound packages 400. The operations for adapting exchange tables 225 and shadow tables 220 of target system 150 starts by stopping source system 110 (e.g., users are logged off except for administrator users) and target system 150 (e.g., users are logged off except for administrator users). As described above, during the operations for enriching target system 150, migration manager 160 retrieved the table metadata associated with the updates to software version 1.5 and exchange table manager 165 stored them in exchange table data storage 180. After target system 150 is stopped, migration manager 115 adapts the structure of exchange tables 225 by instructing exchange table manager 165 to create tables in exchange tables 225 based on the table metadata associated with the updates to software version 1.5. Migration manager 155 also adapt the structure of shadow tables 220 by instructing application table manager 160 to create tables in shadow tables 220 based on the table metadata associated with the updates to software version 1.5.

Next, migration manager 155 retrieves the custom development objects and/or generated custom development objects stored in shared directory 300. Migration manager 155 then adapts the contents of exchange tables 225 by instructing exchange table manager 165 to transfer the contents configured for exchange tables from bound packages 400 to exchange tables 225 and to store the custom development objects and/or generated custom development objects retrieved from shared directory 300 in exchange tables 225. At this point, the version of exchange tables 225 and shadow tables 220 are at the desired upgrade level, as shown in FIG. 6.

Figure 7:
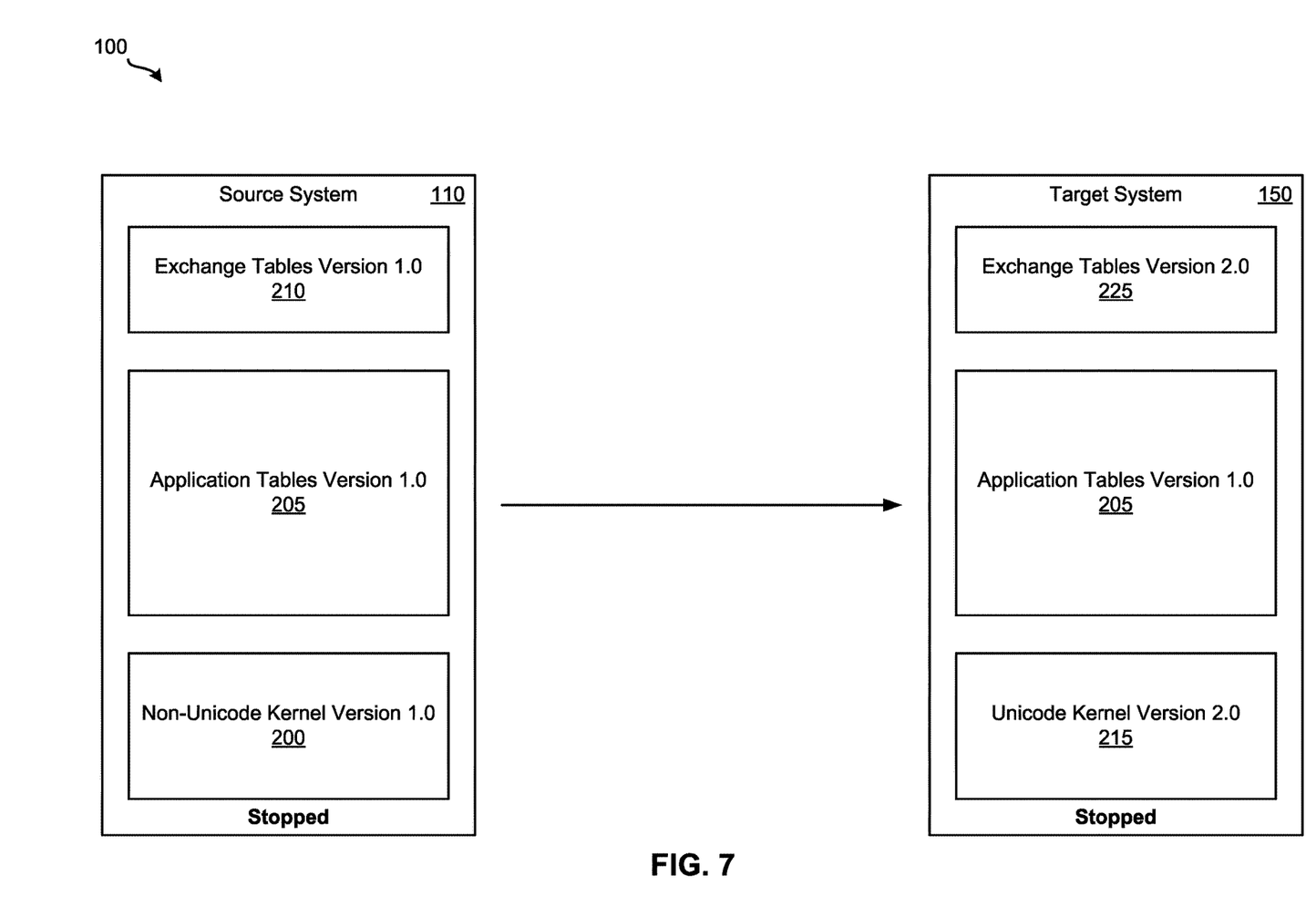
FIG. 7 illustrates the migration of application tables according to some embodiments.

Operations for migrating application tables are performed next. FIG. 7 illustrates the migration of application tables according to some embodiments. At this stage, source system 110 is in a running state, exchange tables 210 are in a locked state, and target system 150 is in a stopped state. The operations for migrating application tables begins with performing object generation. In some embodiments, object generation includes migration manager 155 using shadow tables 220 to compile source code stored in exchange tables 225 to generate executable programs, which migration manager 155 instructs exchange table manager 165 to store in exchange table data storage 180. Object generation can also include migration manager 155 using shadow tables 220 to generate other objects (e.g., enhancement objects, lock objects, etc.). Then, source system 110 is put in a stopped state. Next, migration manager 155 instructs application table manager 160 to drop shadow tables 220. In some embodiments, migration manager 155 drops shadow tables 220 by instructing application table manager 160 to rename shadow tables 220 to temporary names. In some such embodiments, migration manager 155 deletes shadow tables 220 after the migration operation is complete in order to reduce the amount of downtime of target system 150 because deleting tables takes more time than renaming tables. In other embodiments, migration manager 155 drops shadow tables 220 by instructing application table manager 160 to delete shadow tables 220. Still, in some embodiments, migration manager 155 drops shadow tables 220 by keeping the structure of shadow tables 220 but deleting the contents of shadow tables 220.

After dropping shadow tables 220, migration manager 115 sends application tables 205 to migration manager 155. In some embodiments, before sending application tables 205 to migration manager 155, migration manager 115 converts the data stored in application tables 205 from the non-Unicode in which the data are currently encoded to a Unicode encoding. In response, migration manager 155 instructs application table manager 160 to store application tables 205 in application table data storage 175. FIG. 7 shows target system 150 after shadow tables 220 have been dropped and application table manager 160 has stored application tables 205 in application table data storage 175.

Figure 8:
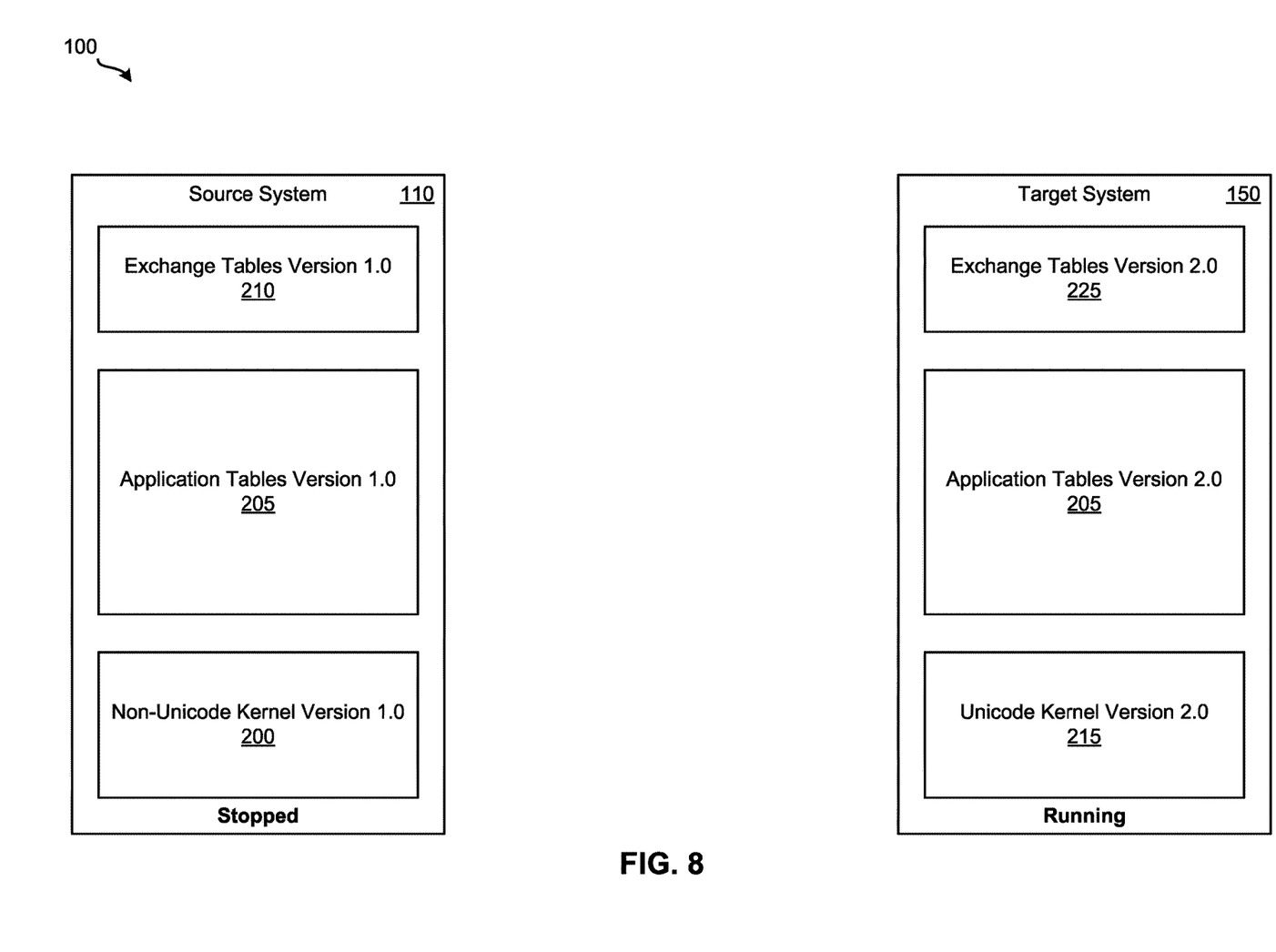
FIG. 8 illustrates a target system after a database migration according to some embodiments.

Next, migration manager 155 instructs application table manager 160 to adjust the structure of the received application tables 205. As explained above, during the operations for activating data dictionaries in target system 150, migration manager 155 generates a set of instructions (e.g., a set of data definition language (DDL) statements) for modifying the table structure of the source system 110 to match the table structure of the target system 150, which are stored in a table in database 170. Application table manager 160 adjusts the structure of the received application tables 205 by retrieving the set of instructions and executing the set of instructions to modify the structure of the received application tables 205 to the desired upgrade level of version 2.0. In some embodiments, migration manager 155 can perform other post-transport operations, post-processing operations, and cleanup operations. Finally, target system 150 is put in a running state. FIG. 8 illustrates target system 150 after a database migration according to some embodiments. As shown, application tables 205 in target system 150 is now at version 2.0. In addition, target system 150 is depicted to be in a running state.

Figure 9:
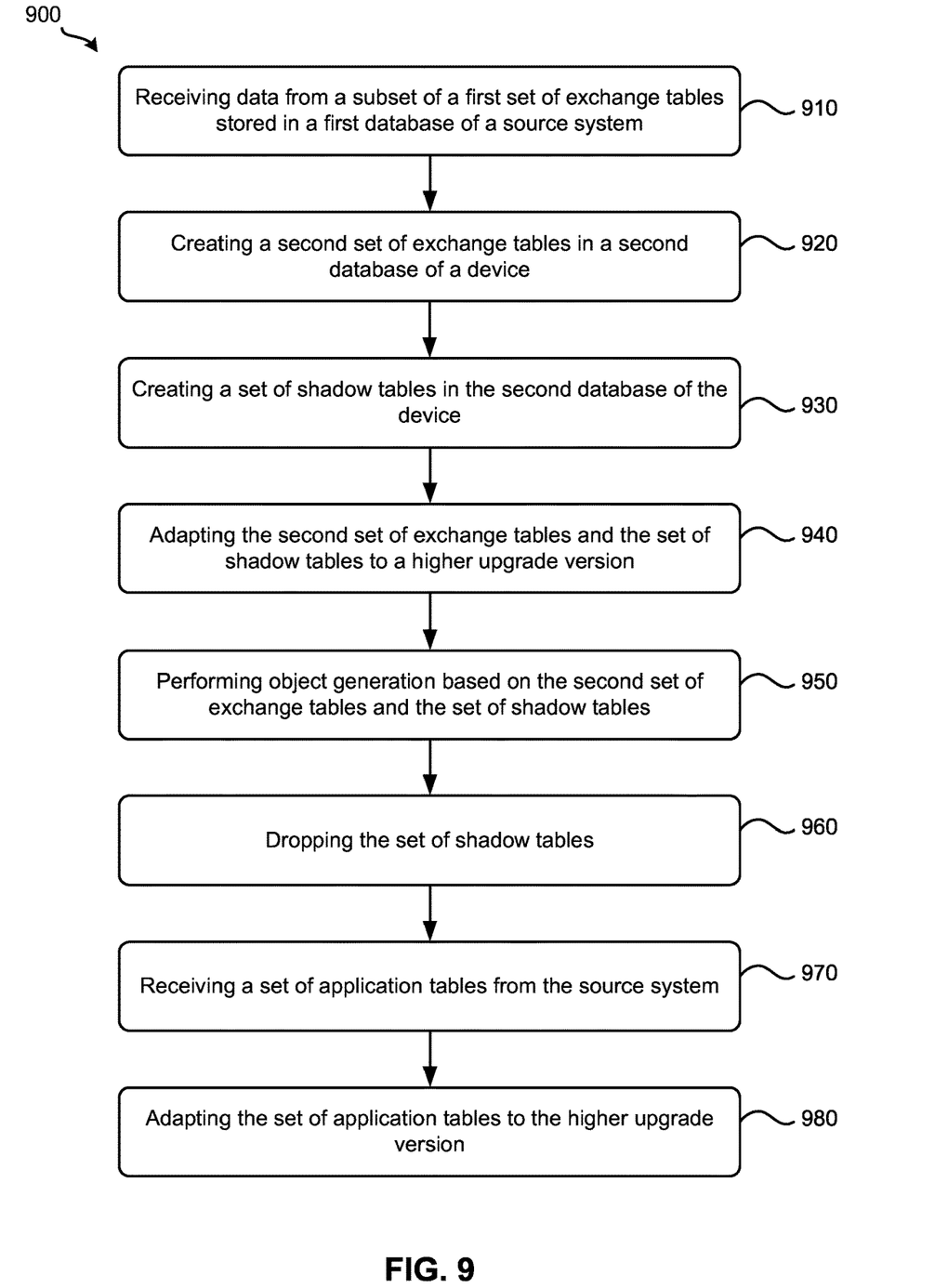
FIG. 9 illustrates a process for migrating database according to some embodiments.

FIG. 9 illustrates process 900 for migrating database according to some embodiments. In some embodiments, target system 150 performs process 900. Process 900 starts by receiving, at 910, data from a subset of a first set of exchange tables stored in a first database of a source system. Referring to FIGS. 1 and 4 as an example, migration manager 155 receives, from shared directory 300, data from a subset of exchange tables 210.

Next, process 900 creates, at 920, a second set of exchange tables in a second database of the device. The second set of exchange tables may include the data from the subset of the first set of exchange tables and data from an upgrade version of the set of exchange tables stored in the first database of the source system. Referring to FIGS. 1-3 as an example, when target system 150 receives upgrade load 215, exchange table manager 165 creates exchange tables 225 and transfers the content for exchange tables 225 from upgrade load 215 to exchange table data storage 180.

Process 900 then creates, at 930, a set of shadow tables in the second database of the device. The set of shadow tables can correspond to a subset of a first set of application tables stored in the first database of the source system. Also, the set of shadow tables may include data from an upgrade version of the subset of the first set of application tables stored in the first database of the source system. Referring to FIGS. 1 and 2 as an example, when target system 150 receives upgrade load 215, application table manager 160 creates shadow tables 220 and transfers the content for shadow tables 220 from upgrade load 215 to application table data storage 175.

After creating the set of shadow tables, process 900 adapts, at 940, the second set of exchange tables and the set of shadow tables to a higher upgrade version. Referring to FIGS. 1 and 6 as an example, migration manager 115 may adapt the structure of exchange tables 225 by instructing exchange table manager 165 to create tables in exchange tables 225 based on table metadata associated with updates to software version 1.5 and instructing application table manager 160 to create tables in shadow tables 220 based on the table metadata associated with the updates to software version 1.5. Migration manager 155 can adapt the contents of exchange tables 225 by instructing exchange table manager 165 to transfer the contents configured for exchange tables from bound packages 400 to exchange tables 225 and to store the custom development objects and/or generated custom development objects retrieved from shared directory 300 in exchange tables 225. In addition, migration manager 155 can adapt the contents of shadow tables 225 by instructing by application table manager 160 to transfer the contents configured for shadow tables from bound packages 400 to shadow tables 225. At this point, the version of exchange tables 225 and shadow tables 220 are at the desired upgrade level, as illustrated in FIG. 6.

Once process 900 adapts the second set of exchange tables and the set of shadow tables to the higher upgrade version, process 900 then perform, at 950, object generation based on the second set of exchange tables and the set of shadow tables. Referring to FIG. 1 as an example, migration manager 155 may perform object generation by using shadow tables 220 to compile source code stored in exchange tables 225 to generate executable programs, instruct exchange table manager 165 to store the executable programs in exchange table data storage 180, and using shadow tables 220 to generate other objects (e.g., enhancement objects, lock objects, etc.).

Next, process 900 drops, at 960, the set of shadow tables. Referring to FIGS. 1 and 7 as an example, migration manager 155 may instruct application table manager 160 to drop shadow tables 220. In some embodiments, migration manager 155 drops shadow tables 220 by instructing application table manager 160 to rename shadow tables 220 to temporary names and then deleting shadow tables 220 after the migration operation is complete. In other embodiments, migration manager 155 drops shadow tables 220 by instructing application table manager 160 to delete shadow tables 220. Yet, in some embodiments, migration manager 155 can drop shadow tables 220 by keeping the structure of shadow tables 220 but deleting the contents of shadow tables 220.

Process 900 then receives, at 970, a set of application tables from the source system. Referring to FIGS. 1 and 7 as an example, migration manager 115 can send application tables 205 to migration manager 155. In some embodiments, before sending application tables 205 to migration manager 155, migration manager 115 converts the data stored in application tables 205 from the non-Unicode in which the data are currently encoded to a Unicode encoding.

Finally, process 900 adapts, at 980, the set of application tables to the higher upgrade version. Referring to FIGS. 1 and 8 as an example, migration manager 155 may adapt the set of application tables by instructing application table manager 160 to adjust the structure of the received application tables 205. Application table manager 160 may adjust the structure of the received application tables 205 by retrieving the set of instructions for modifying the table structure of the source system 110 to match the table structure of the target system 150 and executing the set of instructions to modify the structure of the received application tables 205 to the desired upgrade level of version 2.0.

Figure 10:
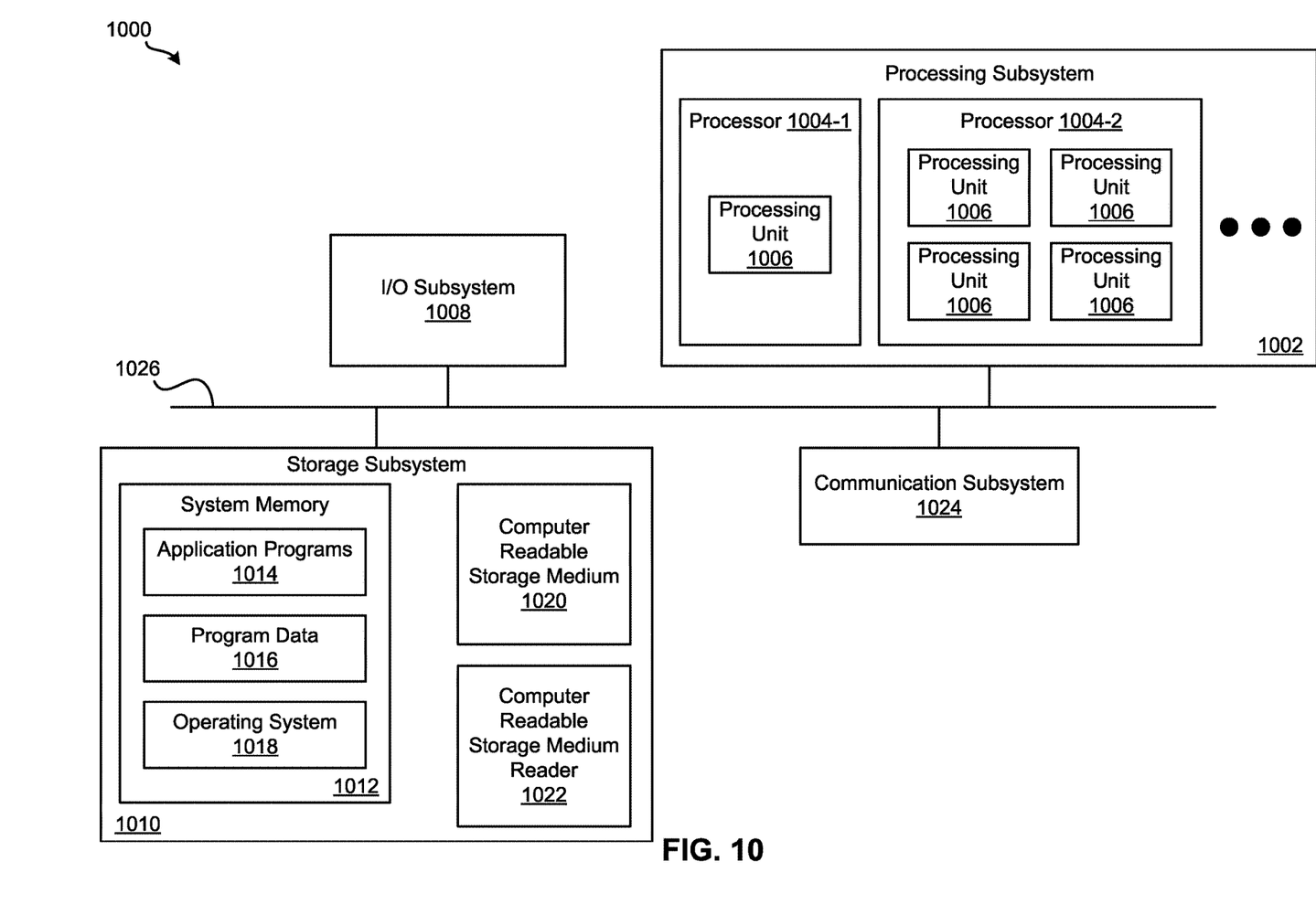
FIG. 10 illustrates an exemplary computer system, in which various embodiments may be implemented.

FIG. 10 illustrates an exemplary computer system 1000 for implementing various embodiments described above. For example, computer system 1000 may be used to implement source system 110 and target system 150. Computer system 1000 may be a desktop computer, a laptop, a server computer, or any other type of computer system or combination thereof. Some or all elements of migration manager 115, application table manager 120, exchange table manager 125, migration manager 155, application table manager 160, exchange table manager 165, or combinations thereof can be included or implemented in computer system 1000. In addition, computer system 1000 can implement many of the operations, methods, and/or processes described above (e.g., process 900). As shown in FIG. 10, computer system 1000 includes processing subsystem 1002, which communicates, via bus subsystem 1026, with input/output (I/O) subsystem 1008, storage subsystem 1010 and communication subsystem 1024.

Bus subsystem 1026 is configured to facilitate communication among the various components and subsystems of computer system 1000. While bus subsystem 1026 is illustrated in FIG. 10 as a single bus, one of ordinary skill in the art will understand that bus subsystem 1026 may be implemented as multiple buses. Bus subsystem 1026 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1002, which can be implemented as one or more integrated circuits (e.g., a conventional microprocessor or microcontroller), controls the operation of computer system 1000. Processing subsystem 1002 may include one or more processors 1004. Each processor 1004 may include one processing unit 1006 (e.g., a single core processor such as processor 1004-1) or several processing units 1006 (e.g., a multicore processor such as processor 1004-2). In some embodiments, processors 1004 of processing subsystem 1002 may be implemented as independent processors while, in other embodiments, processors 1004 of processing subsystem 1002 may be implemented as multiple processors integrate into a single chip or multiple chips. Still, in some embodiments, processors 1004 of processing subsystem 1002 may be implemented as a combination of independent processors and multiple processors integrated into a single chip or multiple chips.

In some embodiments, processing subsystem 1002 can execute a variety of programs or processes in response to program code and can maintain multiple concurrently executing programs or processes. At any given time, some or all of the program code to be executed can reside in processing subsystem 1002 and/or in storage subsystem

1010. Through suitable programming, processing subsystem 1002 can provide various functionalities, such as the functionalities described above by reference to process 900, etc.

I/O subsystem 1008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1000 to a user or another device (e.g., a printer).

As illustrated in FIG. 10, storage subsystem 1010 includes system memory 1012, computer-readable storage medium 1020, and computer-readable storage medium reader 1022. System memory 1012 may be configured to store software in the form of program instructions that are loadable and executable by processing subsystem 1002 as well as data generated during the execution of program instructions. In some embodiments, system memory 1012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1012 may include different types of memory, such as static random access memory (SRAM) and/or dynamic random access memory (DRAM). System memory 1012 may include a basic input/output system (BIOS), in some embodiments, that is configured to store basic routines to facilitate transferring information between elements within computer system 1000 (e.g., during start-up). Such a BIOS may be stored in ROM (e.g., a ROM chip), flash memory, or any other type of memory that may be configured to store the BIOS.

As shown in FIG. 10, system memory 1012 includes application programs 1014, program data 1016, and operating system (OS) 1018. OS 1018 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1020 may be a non-transitory computer-readable medium configured to store software (e.g., programs, code modules, data constructs, instructions, etc.). Many of the components (e.g., migration manager 115, application table manager 120, exchange table manager 125, migration manager 155, application table manager 160, and exchange table manager 165) and/or processes (e.g., process 900) described above may be implemented as software that when executed by a processor or processing unit (e.g., a processor or processing unit of processing subsystem 1002) performs the operations of such components and/or processes. Storage subsystem 1010 may also store data used for, or generated during, the execution of the software.

Storage subsystem 1010 may also include computer-readable storage medium reader 1022 that is configured to communicate with computer-readable storage medium 1020. Together and, optionally, in combination with system memory 1012, computer-readable storage medium 1020 may comprehensively represent remote, local, fixed, and/or removable storage devices plus storage media for temporarily and/or more permanently containing, storing, transmitting, and retrieving computer-readable information.

Computer-readable storage medium 1020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1024 serves as an interface for receiving data from, and transmitting data to, other devices, computer systems, and networks. For example, communication subsystem 1024 may allow computer system 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1024 may provide components configured for wired communication (e.g., Ethernet) in addition to or instead of components configured for wireless communication.

One of ordinary skill in the art will realize that the architecture shown in FIG. 10 is only an example architecture of computer system 1000, and that computer system 1000 may have additional or fewer components than shown, or a different configuration of components. The various components shown in FIG. 10 may be implemented in hardware, software, firmware or any combination thereof, including one or more signal processing and/or application specific integrated circuits.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
receiving data from a subset of a first set of exchange tables encoded in a non-Unicode encoding and stored in a first database of a source system;
creating a second set of exchange tables in a second database of the device, the second set of exchange tables comprising the data from the subset of the first set of exchange tables and data from an upgrade version of the set of exchange tables stored in the first database of the source system;
creating a set of shadow tables in the second database of the device, wherein the set of shadow tables corresponds to a subset of a first set of application tables stored in the first database of the source system, the set of shadow tables comprising data from an upgrade version of the subset of the first set of application tables stored in the first database of the source system;
adapting the second set of exchange tables and the set of shadow tables to a higher upgrade Unicode version;
performing object generation based on the second set of exchange tables and the set of shadow tables;
dropping the set of shadow tables;
receiving a set of application tables from the source system; and
adapting the set of application tables to the higher upgrade version.

2. The non-transitory machine-readable medium of claim 1, wherein the program further comprises a set of instructions for installing, on the device, a first kernel that is the higher upgrade Unicode version of a second non-Unicode kernel operating on the source system.

3. The non-transitory machine-readable medium of claim 2, wherein the first kernel is a Unicode kernel and the second kernel is a non-Unicode kernel.

4. The non-transitory machine-readable medium of claim 1, wherein the program further comprises set of instructions for:
receiving, from the source system, a first set of table metadata 3 associated with the first set of exchange tables stored in the first database of the source system and the first set of application tables stored in the first database of the source system;
receiving a second set of table metadata associated with an upgrade version of the first set of exchange tables stored in the first database of the source system and an upgrade version of the first set of application tables stored in the first database of the source system;
determining a set of differences between the first set of table metadata and the second set of table metadata; and
generating a set of instructions based on the set of differences, wherein adapting the set of application tables to the higher upgrade version comprises executing the set of instructions.

5. The non-transitory machine-readable medium of claim 4, wherein the first set of table metadata and the second set of table metadata are received from a file directory shared between the device and the source system.

6. The non-transitory machine-readable medium of claim 1, wherein the machine-readable medium is a first machine-readable medium, wherein the program further comprises a set of instructions for retrieving the data from the upgrade version of the set of exchange tables stored on the source system from a second machine-readable medium.

7. The non-transitory machine-readable medium of claim 5, wherein the program further comprises set of instructions for:
retrieving a non-Unicode version of table metadata describing the application tables and a Unicode version of the table metadata from the file directory shared between the device and the source system.

8. The non-transitory machine-readable medium of claim 6, wherein the program further comprises set of instructions for:
retrieving a first kernel, that is the higher upgrade Unicode version of a second non-Unicode kernel operating on the source system, from the same second machine-readable medium that the data from the upgrade version of the set of shadow tables was retrieved from.

9. For a device, a method comprising:
receiving data from a subset of a first set of exchange tables encoded in a non-Unicode encoding and stored in a first database of a source system;
creating a second set of exchange tables in a second database of the device, the second set of exchange tables comprising the data from the subset of the first set of exchange tables and data from an upgrade version of the set of exchange tables stored in the first database of the source system;
creating a set of shadow tables in the second database of the device, wherein the set of shadow tables corresponds to a subset of a first set of application tables stored in the first database of the source system, the set of shadow tables comprising data 10 from an upgrade version of the subset of the first set of application tables stored in the first database of the source system;
adapting the second set of exchange tables and the set of shadow tables to a higher upgrade Unicode version;
performing object generation based on the second set of exchange tables and the set of shadow tables;
dropping the set of shadow tables;
receiving a set of application tables from the source system; and
adapting the set of application tables to the higher upgrade Unicode version.

10. The method of claim 9 further comprising installing, on the device, a first kernel that is the higher upgrade Unicode version of a second non-Unicode kernel operating on the source system.

11. The method of claim 10, wherein the first kernel is a Unicode kernel and the second kernel is a non-Unicode kernel.

12. The method of claim 9 further comprising:
receiving, from the source system, a first set of table metadata associated with the first set of exchange tables stored in the first database of the source system and the first set of application tables stored in the first database of the source system;
receiving a second set of table metadata associated with an upgrade Unicode version of the first set of exchange tables stored in the first database of the source system and
an upgrade Unicode version of the first set of application tables stored in the first database of the source system;

determining a set of differences between the first set of table metadata and the second set of table metadata; and generating a set of instructions based on the set of differences, wherein adapting the set of application tables to the higher upgrade Unicode version comprises executing the set of instructions.

13. The method of claim 12, wherein the first set of table metadata and the second set of table metadata are received from a file directory shared between the device and the source system.

14. The method of claim 9 further comprising retrieving 1 the data from the upgrade version of the set of exchange tables stored on the source system from a machine readable medium.

15. A system comprising:
a set of processing units; and
a non-transitory machine-readable medium storing instructions that when executed by at least one processing unit in the set of processing units cause the at least one processing unit to:
receive data from a subset of a first set of exchange tables encoded in a non-Unicode encoding stored in a first database of a source system;
create a second set of exchange tables in a second database of the system, the second set of exchange tables comprising the data from the subset of the first set of exchange tables and data from an upgrade version of the set of exchange tables stored in the first database of the source system;
create a set of shadow tables in the second database of the system, wherein the set of shadow tables corresponds to a subset of a first set of application tables stored in the first database of the source system, the set of shadow tables comprising data from an upgrade version of the subset of the first set of application tables stored in the first database of the source system;
adapt the second set of exchange tables and the set of shadow tables to a higher upgrade Unicode version;
perform object generation based on the second set of exchange tables and the set of shadow tables;
drop the set of shadow tables;
receive a set of application tables from the source system; and
adapt the set of application tables to the higher upgrade Unicode version.

16. The system of claim 15, wherein the instructions further cause the at least one processing unit to install, on the system, a first kernel that is the higher upgrade Unicode version of a second non-Unicode kernel operating on the source system.

17. The system of claim 16, wherein the first kernel is a Unicode kernel and the second kernel is a non-Unicode kernel.

18. The system of claim 15, wherein the instructions further cause the at least one processing unit to: receive, from the source system, a first set of table metadata associated with the first set of exchange tables stored in the first database of the source system and the first set of application tables stored in the first database of the source system;
receive a second set of table metadata associated with an upgrade Unicode version of the first set of exchange tables stored in the first database of the source system and
an upgrade Unicode version of the first set of application tables stored in the first database of the source system;
determine a set of differences between the first set of table metadata and the second set of table metadata; and
generate a set of instructions based on the set of differences, wherein adapting the set of application tables to the higher upgrade Unicode version comprises executing the set of instructions.

19. The system of claim 15, wherein the instructions further cause the at least one processing unit to retrieve the data from the upgrade version of the set of exchange tables stored on the source system from a machine-readable medium.

20. The system of claim 19, wherein the instructions further cause the at least one processing unit to retrieve the data from the upgrade version of the set of shadow tables stored on the source system from the second machine-readable medium.

* * * * *